United States Patent [19]

Steinmeyer

[11] 4,120,671
[45] Oct. 17, 1978

[54] SEPARATION OF AEROSOLS FROM GASES IN A HORIZONTALLY DISPOSED CYLINDRICAL FIBER BED

[75] Inventor: Daniel E. Steinmeyer, Chesterfield, Mo.

[73] Assignee: Monsanto Company, St. Louis, Mo.

[21] Appl. No.: 693,601

[22] Filed: Jun. 7, 1976

[51] Int. Cl.² .......................................... B01D 46/04
[52] U.S. Cl. ........................................ 55/96; 55/242; 55/486; 55/498
[58] Field of Search .................... 55/96, 97, 185, 186, 55/187, 242, 486, 487, 488, 489, DIG. 25, 90, 418, 259, 498; 210/315, 491

[56] References Cited

U.S. PATENT DOCUMENTS

| | | | |
|---|---|---|---|
| 2,413,769 | 1/1947 | Kasten | 55/486 |
| 2,994,406 | 8/1961 | Hemeon | 55/242 |
| 3,066,462 | 12/1962 | Yap et al. | 55/486 |
| 3,107,986 | 10/1963 | Plaut et al. | 55/97 |
| 3,197,946 | 8/1965 | Taylor | 55/97 |
| 3,268,296 | 8/1966 | Hall et al. | 55/96 |
| 3,540,190 | 11/1970 | Brink, Jr. | 55/97 |
| 3,745,748 | 7/1973 | Goldfield et al. | 55/97 |
| 3,763,631 | 10/1973 | Horn et al. | 55/96 |
| 3,890,123 | 6/1975 | Kuga | 55/486 |

FOREIGN PATENT DOCUMENTS 291,547 10/1969 U.S.S.R. .................. 55/488

*Primary Examiner*—Frank W. Lutter
*Assistant Examiner*—David L. Lacey
*Attorney, Agent, or Firm*—A. E. Hoffman

[57] ABSTRACT

A fiber bed separator and method are provided for separating liquids from gases using cylindrical fiber bed elements disposed in a non-vertical position, preferably at an angle of from 0° to 75° from horizontal, and particularly disposed in a substantially horizontal position. The fiber bed is of fiber of at least 5 micron mean diameter packed to a bed voidage of from about 85 to 98%, the fiber diameter and bed voidage being selected such that at design bed velocity and liquid loading the fiber bed is not flooded and the residual saturation of the fiber bed against gas drag ($R_v$) on the liquid collected is less than the residual saturation of said bed against gravity drainage ($R_g$). The gas stream containing the liquid flows from the hollow core of the cylindrical element radially through the fiber bed such that the gas and the collected liquid phase flow radially outwardly through said fiber bed and the liquid drains downwardly around the outer circumference of the fiber bed. In one embodiment said fiber bed separator and method is employed to remove liquid aerosols of submicron size and larger from gases. In another embodiment, said fiber bed separator and method is employed to remove aerosols of sub-micron size and larger from gases in applications wherein the aerosol becomes collected in the fiber bed and does not flow therefrom and for the cleaning of such fiber beds by introducing a liquid into a gas stream upstream of the fiber bed.

27 Claims, 6 Drawing Figures

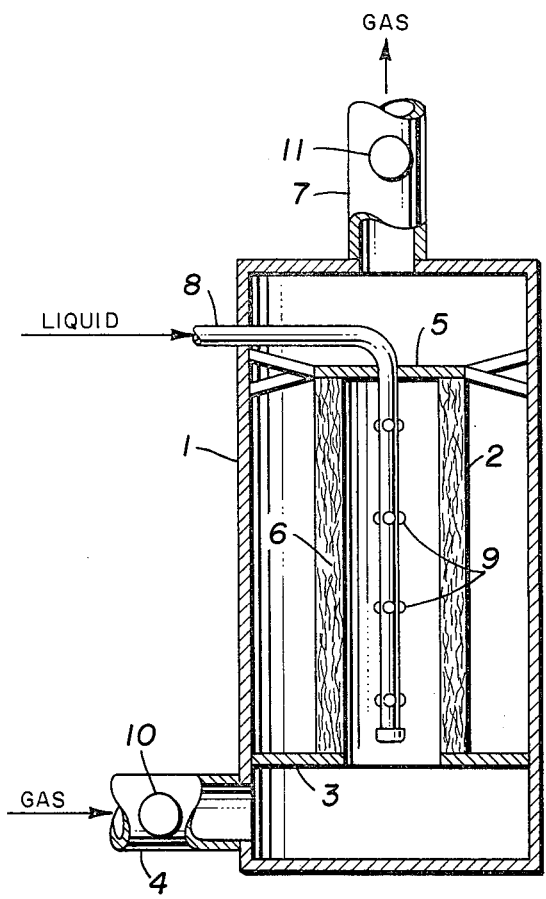
FIG. 3.
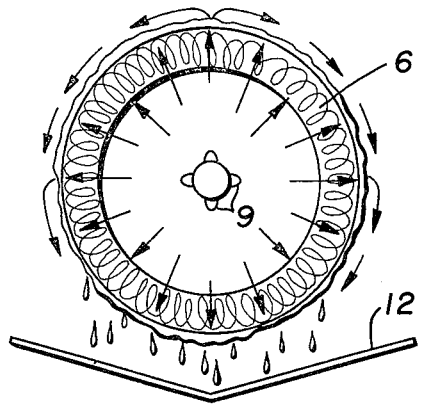
FIG. 4. $R_v < R_g$
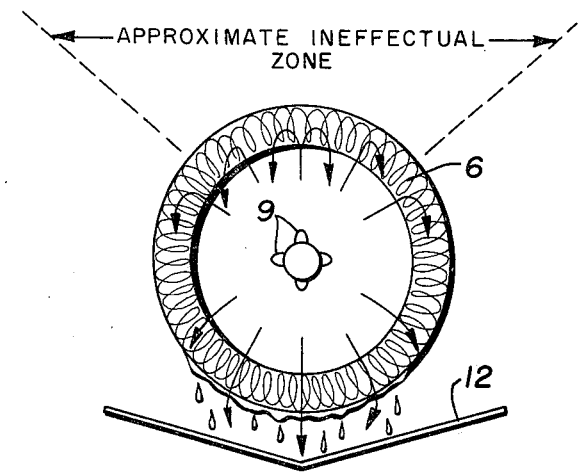
FIG. 5. $R_v > R_g$
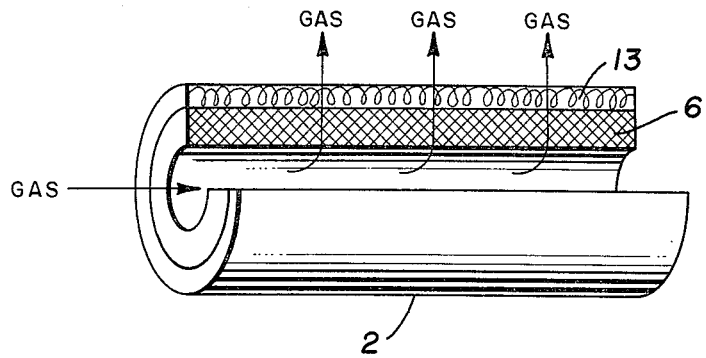
FIG. 6.

SEPARATION OF AEROSOLS FROM GASES IN A HORIZONTALLY DISPOSED CYLINDRICAL FIBER BED

BACKGROUND OF THE INVENTION

This invention relates to an improved fiber bed separator and method for the separation of liquid aerosols and sprays from gas streams. More particularly, it relates to a fiber bed separator and process wherein cylindrical fiber bed separator element(s), each comprising a fiber bed packed into the annulus formed between 2 substantially concentric support screens, is(are) disposed in a substantially non-vertical position.

DESCRIPTION OF THE PRIOR ART

Fiber bed separators have found widespread use in applications wherein extremely fine aerosols of under 3 microns, and particularly under 1 micron, in particle size must be separated from a gas vapor (hereinafter and in the claims collectively referred to as gas) stream. Fiber beds of up to 20 micron fibers have been found to remove sub-micron up to 3 micron sized aerosols with high collection efficiency, for example, as high as 98-99.9% efficiency. In applications requiring or permitting treatment of such aerosols containing gases at high bed velocities (such as for example 300 feet per minute or more) larger diameter fibers have been used, e.g., about 25 to 50 microns, with some sacrifice in collection efficiency but even then efficiencies of 85 to 95% are attainable. Some of the more frequent applications include removal of acid mists, such as sulfuric acid mist, in acid manufacturing processes, plasticizer mists in, for example, polyvinyl chloride floor or wall covering manufacture, water soluble solid aerosols such as, for example, emissions from ammonium nitrate prill towers. In removal of water soluble solid aerosols, the collected particulates are dissolved in a liquid within the fiber bed through use of an irrigated fiber bed or of a fogging spray of liquid such as water injected into the gas stream prior to the fiber bed.

In pending application Ser. No. 642,921, filed Dec. 12, 1975 by W. B. Argo et al, (commonly assigned), there is described an improvement in the design and operation of fiber bed separators whereby reentrainment of the collected liquid phase separated from aerosol containing gases in the treated gas is prevented. The devices taught therein are either cylindrical or flat bed separator elements comprising two non-matting fiber beds, the first fiber bed, in the direction of gas flow, being designed such that at the design bed velocity and aerosol loading, the residual saturation of the fiber bed against gas phase drag of the liquid phase ($R_v$) within the fiber bed is less than the residual saturation of the fiber bed against gravity drainage of the liquid phase ($R_g$) within the fiber bed. The second fiber bed is then designed to have the opposite relationship between $R_v$ and $R_g$. This principle will be defined in greater detail later in this specification.

Cylindrical fiber bed separator elements of the type described herein have been known and in use for over 20 years and until now it has been commonly believed that cylindrical elements must always be disposed in a vertical position for the removal of liquid aerosols so that the collected liquid phase can drain downwardly through the fiber bed or the downstream surface of the fiber bed without hold up by gas flowing counter-current to said draining liquid. In fact, cylindrical elements used in applications involving liquid/gas separation are specified by all manufacturers of cylindrical elements for use solely in the vertical position. From time to time, customers have inquired as to the possibility of mounting the cylindrical elements in a horizontal position and the standard response and belief has consistently been that it cannot be done.

The only applications in which cylindrical elements have been disposed in a horizontal position are those wherein no liquid is involved, either as the aerosol being separated or as a spray to irrigate or wash the fiber bed. Horizontal positioning has been limited solely to recovery of solid aerosols, e.g., platinum dust, from gases with the fiber bed being disposed of or removed for separate cleaning when plugged to the extent it no longer performs acceptably.

SUMMARY OF THE INVENTION

I have unexpectedly discovered that when a cylindrical fiber bed element is designed such that at design bed velocity and liquid aerosol or spray loading the $R_v$ of the bed is less than the $R_g$ of the bed, (both terms being hereinafter defined), vertical positioning of the cylindrical element is not necessary and that, in fact, removal of a liquid aerosol or spray from the gas stream becomes dependent of the positioning of the cylindrical element, allowing it to be disposed at any angle, even horizontally.

It is an object of this invention to provide a fiber bed separator for treatment of gases containing liquid aerosols or sprays using cylindrical fiber bed element(s) disposed in a substantially non-vertical position.

Another object is the provision of such fiber bed separator and method, for removal of sub-micron and larger liquid aerosol particulates with high collection efficiency.

A further object is the provision of a method for treatment of gases containing liquid aerosols or sprays using cylindrical fiber bed element(s) disposed in a substantially non-vertical position.

Another object is the provision of such fiber bed separator and method, for removal of sub-micron and larger liquid aerosol particulates from high volumes of gases at high bed velocities.

Another object is the provision of such fiber bed separator and method for removal of sub-micron and larger solid or non-flowable liquid (e.g., greases) aerosols from gases wherein the collected particles intermittently or continuously removed from the fiber bed by irrigation or spraying with a liquid media.

Another object is the provision of such fiber bed separator and method, wherein the cylindrical element(s) are disposed substantially horizontally, or at such angle from the horizontal, e.g., up to about 75°, or preferably about 30° so as to allow flexibility of design permitting low profile or savings in power requirements to move the gas through the separator.

These and other objects are attained by a method and separators employing such method which comprises providing a fiber bed separator comprising inlet means for the gas being treated, at least one cylindrical fiber bed element disposed in a substantially non-vertical position, outlet means for the collected liquid phase, and baffle means causing the gas being treated to flow into the hollow core(s) (as hereinafter defined) of said cylindrical element(s) and thence through the fiber bed(s) thereof; each said cylindrical element comprising a non-matting bed of randomly distributed fibers having a mean fiber diameter of at least about 5 microns and packed to a substantially uniform bed voidage of from about 85% to 98% within the annular space between two substantially concentric cylindrical screens forming a cylindrical element having a hollow core; said mean fiber diameter and said bed voidage being selected such that at design bed velocity and liquid aerosol or spray loading said fiber bed will not flood with collected liquid phase and the residual saturation of said fiber bed against gas phase drag ($R_v$) of the liquid phase is less than the residual saturation of said fiber bed against gravity drainage ($R_g$) of the liquid phase.

The present is equally applicable to applications requiring treatment of gases containing sub-micron and larger liquid aerosols to separate the liquid from the gas, as well as to applications wherein the performance characteristics of the cylindrical elements are useful or necessary for separation of solid or non-flowing liquid (e.g., greases) aerosols of such size and removal thereof from the fiber bed is accomplished by irrigating the core-side surface of the fiber bed or spraying a liquid into the gas stream being treated or into another gas stream such as air, upstream of the fiber bed. As will hereinafter be apparent, the liquid phase within the fiber bed doesn't know or care what form the liquid was in as it entered the fiber bed together with the gas, insofar as the relationship between $R_v$ and $R_g$ of this liquid phase within the fiber bed is concerned.

Selection of fiber diameters and/or bed voidages as required above to provide mechanical stability of the fiber bed and non-flooding collection of liquid is well within the ordinary skills of the art. In general, the smaller the mean fiber diameter the lower must be the bed voidage (i.e., the packing density must be higher). A mechanically stable bed is one which, for the purposes of this invention, will retain its structural integrity without substantial shifting of fibers in the bed during liquid aerosol collection at the design operating conditions so as to significantly alter its performance characteristics from those designed for, or so as to cause matting of fibers in localized areas which would make such localized area of the bed substantially impervious of flow of liquid or gas.

The thickness of the fiber bed is of no critical concern in the practice of this invention since the bulk of the aerosol is usually separated from the gas within the first inch or two of the fiber bed, though beds up to 4 inches or more are commonly used for higher efficiency. The only limit on the maximum thickness of the fiber bed is the practical limitation of pressure drop through the bed. High Pressure drop means high power requirments to move the gas. Thus, the bed thickness is normally selected so as to provide minimum pressure drop commensurate with the collection efficiency desired and the fiber diameter and bed voidage used, all of which is well within the knowledge of those skilled in the art.

Although in a preferred embodiment of this invention, the cylindrical elements are disposed in a substantially horizontal position within the seperator, the practice of this invention allows positioning of the cylindrical element(s) at any angle without adverse affect upon their performance. In fact, in certain applications, as illustrated in comparing working Examples II and III, infra, horizontal positioning will actually provide better performance. Thus, the cylindrical elements in the practice of this invention can be positioned at any angle, for example, up to 75°, or preferably up to 30°, from the horizontal without adverse affect on their performance, with either the higher or lower end of the cylindrical element disposed toward the gas inlet of the separator. When the higher end of said element is near, however, precautions may sometimes be necessary to avoid reentrainment. Yet, cylindrical elements positioned at such substantial angles from the vertical without applying the principles of this invention would be adversely affected in their performance.

It is to be understood that the present invention is not limited to treatment of liquid aerosol containing gases formed in some process operation requiring use of a separator. Rather, it is equally applicable in processes requiring a separator for collection of solid or relatively non-flowing liquid (e.g., grease) aerosol particulates wherein for the purpose of removing the collected material from the fiber bed, a liquid media is introduced into the gas stream upstream of the fiber bed. For example, the liquid may be introduced into the gas stream being treated prior to the separator, within the separator vessel, or within the hollow cores of the cylindrical elements. The liquid is normally added to the gas stream by irrigating the core-side surface of the fiber bed or by spray or fogging nozzles forming finely dispersed liquid particles in the gas stream. Depending upon process requirements or choice the liquid may be introduced into the gas stream continuously or intermittently, such as, for example, during a cleaning cycle.

In such applications, particularly when the collected material being removed from the fiber bed is only partially soluble or immiscible in the liquid media such that it will tend to separate from the liquid media and congeal (such as grease) or harden, superiod cleaning performance (as opposed to vertical positioning) will be achieved with horizontal positioning of the cylindrical elements or positioning thereof at any angle such that the length of the drainage path around the outer circumference of the element is less than the length of the element. Expressed in another way, since the drainage path around the outer circumference will be in the direction of gravity flow (i.e., vertically vs. earths surface) as the angle of positioning of the element is increased, the length of this drainage path will increase, and superior cleaning can be expected as long as the length of this drainage path (see arrows in FIG. 4) is less than the length of the cylinder.

According to the state of the art prior to this invention, even intermittent introduction of a liquid into the gas stream would have required vertical positioning of the cylindrical elements for successful operation during the period of liquid addition and collection in the fiber bed. Thus, it can be seen that the present invention removes restrictions heretofore placed upon the design and operation of separators employing cylindrical elements even though the separator is intended for use in applications for removing solid aerosols from a gas, but where the collected solids are removed from the fiber bed by cleaning or flushing with liquid.

An understanding of residual saturation of a fiber bed and its effect upon operation of the fiber bed is essential to this invention.

Residual saturation is the maximum quantity of a given liquid which a given fiber bed will hold under given conditions without migration of the liquid from the fiber bed other than by evaporation. It will vary with the nature of the liquid, the nature of the fiber, the fiber diameter, the bed packing density (or void fraction), and it will vary in magnitude depending upon the condition under which it is measured.

This invention is concerned with residual saturation in the bed under two conditions; i.e., the residual saturation attained in the fiber bed against the force of the drag of the gas flowing through the bed ($R_v$) at the intended design bed velocity, and the residual saturation attained in the bed against the force of gravity ($R_g$). It is helpful to visualize residual saturation under each condition (or force) as that maximum loading of liquid in the fiber bed at which the force applied to the liquid (i.e., gas drag in the one case, and gravity in the other case) just balances the resistive forces holding the liquid in the fiber bed.

Residual saturation is in no way to be confused with a flooded or full fiber bed wherein the collected liquid substantially completely fills the void spaces between the fibers in the bed or in the flooded portion of a bed. Residual saturation in the fiber bed separators of this invention will occur at a liquid loading well below the flood stage and is more a function of capillary action and surface tension, rather than a filling of the available void space in the bed.

Thus, in the fiber bed separators and the process of this invention, the fiber bed is selected on the basis of the quantity flow rate (e.g., cubic feet per minute) of the gas to be treated; square feet of surface area of fiber bed; the nature, quantity and particle size distribution of the aerosol contained in the gas; and the desired collection efficiency, pressure drop and bed velocity in the following manner.

Under the design flow conditions, after bed operating equilibrium has been established, the liquid holdup in the fiber bed (expressed, for example, as weight of liquid per unit weight of fiber in the bed, or, if desired, per unit bed volume) is insufficient to cause drainage from the fiber bed by gravity, but is sufficient to allow gas drag to carry the collected liquid to the downstream surface (i.e., the outer circumference) of the fiber bed. As used herein, bed operating equilibrium refers to the steady state condition achieved during actual collection of the liquid where the quantity of liquid entering the fiber bed is equal to the quantity of collected liquid leaving the fiber bed.

The practice of the present invention therefore permits greater freedom in the design of cylindrical element fiber bed separators. Instead of being restricted to high standing separators as was heretofore necessary, the designer is now freed from that restriction and can design low profile separators using cylindrical elements. For example, one application where a low profile is of particular advantage is the use of a fiber bed separator to remove smoke emissions from restaurant char broilers and ovens. While removal of smoke and other solid particulate emissions do not of themselves require any particular orientation of the fiber bed elements, accumulated fats and greases or other solids are periodically removed from the fiber bed by washing (dissolving or flushing) with a liquid media via fogging or spraying nozzles creating a cleansing liquid spray in the gas stream being treated or in an air stream if the gas stream is discontinued during the wash cycle.

Another advantage to the practice of this invention is one of economy in power requirements for moving the gas stream through the separator because the greater flexibility in design permitted the engineer will in many instances permit the use of shorter ducts and eliminate the need for sharp bends in the ducting which result in increased pressure drop. This is particularly advantageous when such separators are added to existing plants to solve pollution emission problems where the engineer needs to fit the separator as best he can to existing process equipment or ductwork.

CALCULATION OF RESIDUAL SATURATION

For the purposes of this invention the following standardized test procedure is employed to determine residual saturation of a given fiber bed against each of gas flow drag and gravity.

After selection of the most desirable fiber material for use in the intended application following considerations well-known to those skilled in the art, an approximation is made of the proper fiber diameter and packing density (i.e., within the 85 to 98% voidage range) of the first fiber bed using design parameters currently used in the art for fiber bed separators. Having established the ball park, residual saturation (against each of gravity and gas drag) data, and preferably a series of curves similar to those known in FIG. 1, for such fiber(s) at varying packing densities can be determined using the following procedure and calculations.

A glass tube, about 10 inches long and of uniform inside diameter of about 1 inch is packed substantially uniformly to a bed depth of about 8 inches at a desired packing density with the desired fibers. The amount of fiber needed is determined by $$W = (d^2 \times L \times Dp)/(1251.7 \times Sf)$$

where:
$W$ = Quantity of fiber required (grams)
$d$ = Inside diameter of the glass tube (mm)
$L$ = Length of the fiber bed (inches)
$Dp$ = Packing density desired (pounds per cubic foot)
$Sf$ = Specific gravity of the fiber material at 20° C.

The residual saturation of this fiber bed against gravity ($R_g$) is determined by placing the glass tube in a vertical position and slowly pouring the liquid under study (i.e., the aerosol to be separated in the intended application) on top of the fiber bed with a liquid head of at least 1 inch. When drainage starts from the lower surface of the fiber bed, cease adding liquid and continue draining until no more liquid comes out of the bottom surface of the fiber bed. Measure the weight increase over the initial weight of the dry fiber (i.e., the quantity of liquid being held up in the fiber bed) and calculate the residual saturation against gravity:

$$R_g = K \times W_1/W$$

where:
$R_g$ = Residual saturation (i.e., liquid holdup) against gravity (grams liquid per gram fiber)
$W_1$ = Weight increase; i.e., quantity of liquid held up in the fiber bed against gravity (grams)
$W$ = Initial dry weight of the fiber (grams)
$K$ = A scale-down factor It should be noted that $R_g$ is determined under static conditions; that is, without gas flow. Thus, $R_g$ will be constant no matter what gas bed velocity is used in actual service.

The scale-down factor (K) is used to correct for dimensional limitations of small fiber beds such as the above. When drainage by gravity flow ceases, there is normally a small amount of residual liquid at the bottom of the fiber bed in addition to that held in the bed by $R_g$ forces. Without further fibers to drain down on, surface tension tends to hold a small additional quantity of liquid on the fibers at and just above the bottom surface of the fiber bed in this $R_g$ test. As the depth of the fiber bed through which gravity drainage occurs is increased and/or fiber diameter is increased, the effect of this additional capillary holdup becomes less and it becomes negligible in about 2 to 3 feet deep beds. If desired, one could use the deeper test bed, e.g., a 2 inch tube packed to a 36 inch bed depth, but beds of such 36 inch depth take such a long time to drain to equilibrium $R_g$ that one skilled in the art will normally wish to use a shallower bed such as the 8 inch deep bed described above even though the correction factor may be needed.

The K factor for the 8 inch bed described above is readily determined as the ratio of the $R_g$ of a large test bed (for example, the 2 inch diameter by 30 inch long bed) to the $R_g$ of the smaller best bed for a given fiber diameter, packing density and liquid. Note that though a large test bed is required to determine the K factor, once determined for a given small test bed all further $R_g$ tests to determine the parameters for that system can be run on the smaller test bed.

Using untreated long staple glass fibers in the small 8 inch test bed of this procedure, a K value of 0.86 was found suitable for mean fiber diameters in the range of from about 7 to 11 microns at packing densities of from about 10 to 16 pounds per cubic foot when the liquid was water, sulfuric acid or dioctyl phthalate. A K value of 1.0 (in other words, no correction necessary) was found suitable for 30 micron curly glass fibers using these same liquids. Thus, it can be seen that once calculated for a given type of fiber, fiber diameter, packing density and type of liquid, the same K value will often be useful over a substantial range. It is, however, advisable to redetermine the K value whenever a different fiber material is to be used or a different liquid is to be used, or when a substantially different fiber-diameter and/or packing density is intended.

Next, the residual saturation against gas drag ($R_v$) is determined. For this test, a glass tube about 6 inches long and of uniform inside diameter of about 1 inch is packed with the same glass fibers to the same substantially uniform packing density with a bed depth (i.e. thickness) of about 3 inches. Here a shorter bed is preferably used for practical reasons since the pressure drop through thicker beds (e.g., the 8 inch bed used to determin $R_g$) would necessitate considerably higher power requirements and it would take inordinately long for $R_v$ equilibrium to be obtained. Since no correction factor for bed depth is involved in the $R_v$ determination, thinner test beds provide excellent measurements without the foregoing disadvantages.

The glass tube, with the fiber bed pre-saturated with the liquid, is placed in a horizontal position and an air supply with controllable flow rate is connected to one end of the tube. Further liquid is added to the glass tube such that a head of liquid forms over the upstream surface of the fiber bed until drainage occurs from the downstream surface. Liquid addition is then stopped.

The air stream is flowed through the fiber bed at a predetermined bed velocity until no further liquid leaves the downstream surface. Since residual saturation of the fiber bed against gas drag ($R_v$) usually decreases as bed velocity increases, it is desirable when determining the $R_v$ of a given fiber bed at a number of different bed velocities, to start with a low bed velocity for the first $R_v$ determination and work incrementally up to higher bed velocities.

$R_v$ is calculated for each bed velocity by measuring the weight increase over the initial weight of the dry fiber (i.e., the quantity of liquid being held up in the fiber bed) and using the following formula:

$$R_v = \Delta W_2/w$$

where:

$R_v$ = Residual saturation (i.e., liquid holdup) against gas drag (grams liquid per gram fiber)

$\Delta W_2$ = Weight increase; i.e., quantity of liquid held up in the fiber bed against gas drag (grams)

$W$ = Initial dry weight of the fiber (grams)

In designing the fiber bed separator for a given application, it is helpful to generate a series of $R_g$ and $R_v$ data points for fiber beds of different bed voidages and fiber diameters and chart the results as shown in FIG. 1 to aid in proper fiber bed design.

The task of the practitioner in designing fiber bed separators according to this invention is greatly simplified since once the relationship between $R_g$ and $R_v$ has been determined, for example, by a graph such as FIG. 1, the actual magnitude of $R_g$ and $R_v$ at a given set of conditions becomes totally immaterial. The only consideration then is whether $R_g$ is greater or less than $R_v$. Thus, the $R_g$ and $R_v$ data may be experimentally developed using a safe liquid such as water or dioctyl phthalate and the results can be used for any liquid wherein the order of the $R_g$ to $R_v$ relationship is substantially the same, regardless of what the actual magnitudes of $R_g$ and $R_v$ may be at corresponding conditions.

DESCRIPTION OF THE DRAWINGS

FIG. 3 is a side view, partly cut away, of the fiber bed separator of FIG. 2 positioned such that the cylindrical element is disposed in a vertical position. FIG. 3 does not constitute a part of this invention, but rather is presented for comparative purposes for use in the working examples, infra, illustrating that by practice of this invention, aerosol removal from gases becomes independent of positioning of the cylindrical elements.

FIG. 4 is an end view of a horizontally positioned cylindrical element showing the flow path of the collected liquid phase when following the practice of this invention; i.e., when $R_v$ is less than $R_g$.

FIG. 5, presented for comparative purposes, is an end view of the horizontally positioned cylindrical element of FIG. 4 showing the flow path of the collected liquid phase when the principles of this invention are not followed; i.e., when $R_v$ is greater than $R_g$.

FIG. 6 is a perspective view, partly cut away, of a cylindrical fiber bed element which forms another embodiment of this invention.

Support screens have been omitted from the cylindrical elements in all of these drawings for clarity.

DESCRIPTION OF THE PREFERRED EMBODIMENTS

Figure 1:
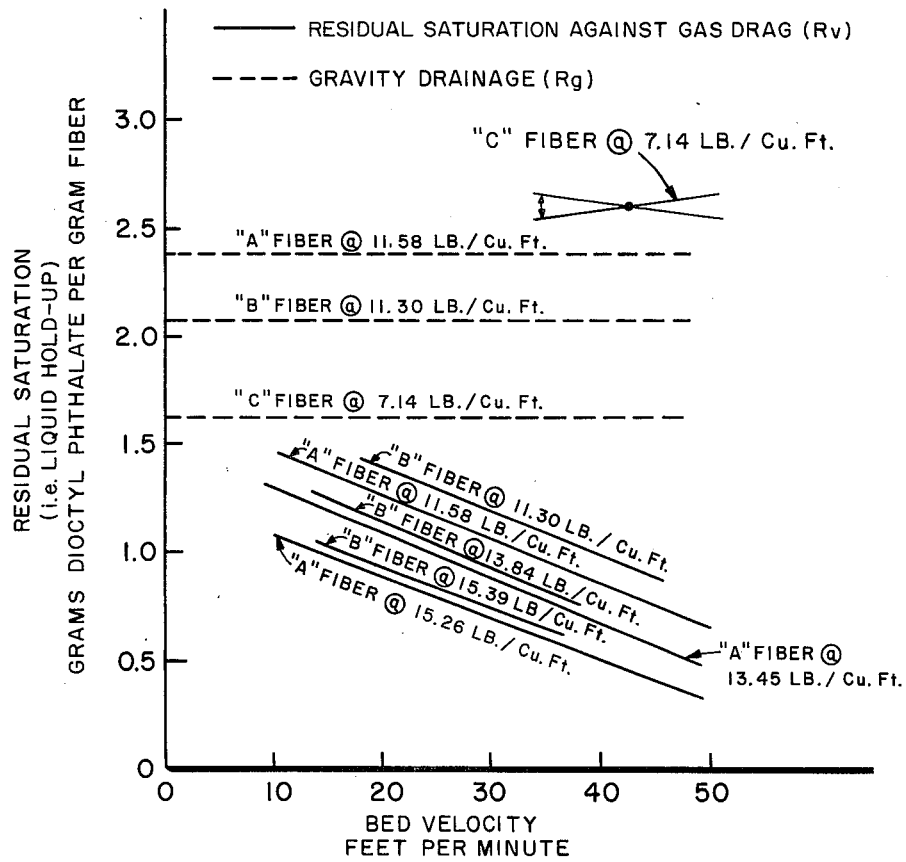
FIG. 1 is a graphic plot of residual saturation (both against gas drag and against gravity) versus bed velocity of the gas for each of 3 different fibers at varying packing densities (i.e., void fractions). It represents one embodiment of this invention.

FIG. 1 shows graphically the relationship between residual saturation (i.e., equilibrium liquid holdup) and gas bed velocity in the case of a dioctyl phthalate plasticizer mist or aerosol in air using untreated hydrophilic type glass fibers at various bed void fractions (i.e., packing densities).

It has been found that the $R_v$ to $R_g$ relationships found in FIG. 1 for dioctyl phthalate (specific gravity 0.9) are fully applicable to sulfuric acid (specific gravity 1.5), water, and the detergent solutions used in the working examples, infra, with only minor shifts in the relative positions of the curves when the absolute values of $R_g$ and $R_v$ for the different liquids are disregarded. It is recommended that when any new liquid application or fiber material are to be designed for, one should run at least a few $R_g$ and $R_v$ determinations for the new system to be sure that any data developed for other systems will be suitable for use. Note also that if design parameters are chosen such that in any one fiber bed $R_g$ will be close to $R_v$ in magnitude, it is desirable to generate new data rather than rely on a general relationship with data for other systems.

Since this invention is applicable to cylindrical fiber bed elements without regard to the nature of the fiber material, dicussion of the packing density of the fiber bed is only meaningful in the generic sense in terms of the void fraction of the bed (i.e., % bed voidage). Once the fiber material to be used has been established, however, and its specific gravity or density is known, it becomes more useful to refer to the packing density in terms of weight of fiber per unit volume of bed such as pounds per cubic foot or grams per cubic centimeter. Conversion between void fraction and packing density in pounds per cubic foot is accomplished using the following equation:

$$V\% = D_f - D_p/D_f \times 100$$

where

V% = percent voidage, $D_f$ = density of the fiber material, and $D_p$ = packing density.

This equation can be used to equate the packing densities of the various glass fibers shown in FIG. 1 on the basis of the glass having a specific gravity of, for example, 2.55 which corresponds to a glass density ($D_f$) of about 159 pounds per cubic foot.

Untreated, chemically resistant glass fibers of three different nominal fiber diameters were used to generate the data shown in FIG. 1. Each bed is of fibers of rather uniform fiber diameter, 95% or more of the fibers having a diameter within ± 2 microns of the nominal fiber diameter. "A" fiber is a long staple glass fiber having a nominal fiber diameter of 7.6 microns, "B" fiber is a long staple glass fiber of 10.5 microns, and "C" fiber is a curly glass fiber of 30 microns.

As can be seen from FIG. 1, at the low bed velocities shown, beds of A and B fibers at the packing densities shown have an $R_v$ which is less than $R_g$ when dioctyl phthalate (or water, sulfuric acid or the detergent solutions of the working examples, infra) is the liquid being collected. Thus, in practice of this invention for recovery of any of these aerosols or sprays either A or B fiber can be used in the fiber bed at any packing density where under the desired bed velocity conditions $R_v$ is less than $R_g$.

Beds of C fiber, however, at the 7.14 pound per cubic foot packing density, have an $R_v$ greater than $R_g$ for aerosols or sprays of any of these liquids at these low bed velocities. Thus, FIG. 1 shows that C fiber at a low packing density would not be suitable for use as the fiber bed for recovery of any of these liquids at bed velocities of about 30 to 50 feet per minute or more.

Extension of the $R_v$ curve for each given fiber bed and liquid combination beyond the bed velocity ranges shown in FIG. 1 will show that such $R_v$ curves are not necessarily linear over broad ranges of bed velocity. As bed velocity is increased, the relationship between $R_v$ and $R_g$ for that fiber bed will change and can be measured according to the test procedure set forth above if the intended design parameters for the fiber bed so require. Thus, one cannot simply extrapolate any of the $R_v$ curves shown in FIG. 1 beyond the 10 to 50 feet per minute bed velocity range shown in FIG. 1.

From the foregoing description, coupled with the heretofore described method for determining $R_v$ and $R_g$, data and charts similar to FIG. 1 can easily be prepared by those skilled in the art for any combination of liquid, gas flow volume and bed velocity, fiber type, fiber diameter and packing density (i.e., voidage percentage).

This invention is equally applicable to the separation of solid or non-flowing liquid (e.g., grease) aerosols from gases where a liquid (e.g., water in the case of water soluble solids or a solvent or washing solution for water insoluble or immiscible particles) is used either to irrigate the fiber bed or is injected into the gas stream (or an air stream) as a fog or mist prior to the entering the fiber bed. In such instances, the liquid collected is a solution or dispersion of the collected aerosol trapped in the fiber bed in the liquid media chosen. A liquid media of the same concentration and characteristics would be used as the liquid in the test procedure (supra) for calculating $R_v$ and $R_g$ values.

In designing high efficiency separators, the principles of this invention can be applied to any type of fiber of any diameter up to about 20 microns mean diameter. For practical considerations, the fibers used in the fiber bed should be at least 5 micron mean diameter since beds of finer fibers lack the mechanical stability necessary to stand up to the internal forces within the fiber bed during operation without matting or felting, or shifting so as to result in lower packing density areas permitting channeling of the gas and causing loss of efficiency.

The fibers themselves should not absorb the liquid to any substantial degree. Suitable fiber materials include, for example, metals such as stainless steel, titanium, etc.; fibers of polymeric materials such as polyesters, polyvinylchloride, polyethylene terephthalate, fluorocarbons such as Teflon, nylons, polyalkylenes such as polyethylene and polypropylene, etc., and glass. Glass fibers have found particularly widespread use in fiber bed separators and are preferred for use as the fiber bed in the practice of this invention. Suitable glass fibers and fiber beds include both coated and uncoated or untreated glass fibers. Glass fibers coated with a material providing lyophobic properties, and particularly the silicone coated hydrophobic glass fibers taught in U.S. Pat. No. 3,107,986, are particularly useful. However, in an especially preferred embodiment untreated lyophilic, and particularly hydrophilic, glass fibers are used. Especially useful glass fibers are long staple glass fibers in diameters up to about 20 microns, and larger 25 micron or greater curly glass fibers, all of which provide fiber beds of excellent mechanical stability at the low packing densities used to obtain the desired bed voidage. If desired, such fiber beds can be heat treated to relieve stresses from packing or forming the bed and to provide additional mechanical stability.

The fiber bed separators of this invention can be designed for either high efficiency or high bed velocity applications with respect to the sub-micron and larger aerosol (liquid or solid) in the gas stream being treated and for which the cylindrical element is designed. High efficiency elements are normally used where environmental or process requirements require virtually complete removal of aerosol particles in the sub-micron to 3 micron size range. Collection of such aerosol particles at efficiencies up to 99.9% can be achieved in the fiber bed separators of this invention.

Fibers having a mean diameter of from about 5 to 20 microns are used in the fiber bed of such high efficiency separators. Long staple glass fibers of from about 7 to 12 microns mean diameter are especially preferred for an excellent balance between mechanical stability of the bed and collection efficiency.

Higher bed velocity separators are effective (normally 85 to 95% collection efficiency) when the aerosol characteristics are such that only the 1 to 3 micron and larger aerosol particulates are of concern and are such that collection by the impaction mechanism is suitable. In such cases, and particularly when large volumes of gas require treating, larger diameter fibers packed to bed voidages of from 85 to 99% provide adequate separation without high pressure drops. Such separators are typically designed to operate at bed velocities of about 300 and greater feet per minute.

Generally, high velocity separators will use fibers of from about 25 to 75 microns mean diameter in the fiber bed. Glass fibers, and particularly curly glass fibers, are preferred at packing densities of from about 3 to 15, and preferably 5 to 10, pounds per cubic foot.

Fiber bed separators for use at bed velocities intermediate of the foregoing ranges for high efficiency and high velocity separators can be designed according to the teachings of this invention for appropriate applications to obtain any desired balance between collection efficiency and volume of gas to be treated.

Figure 2:
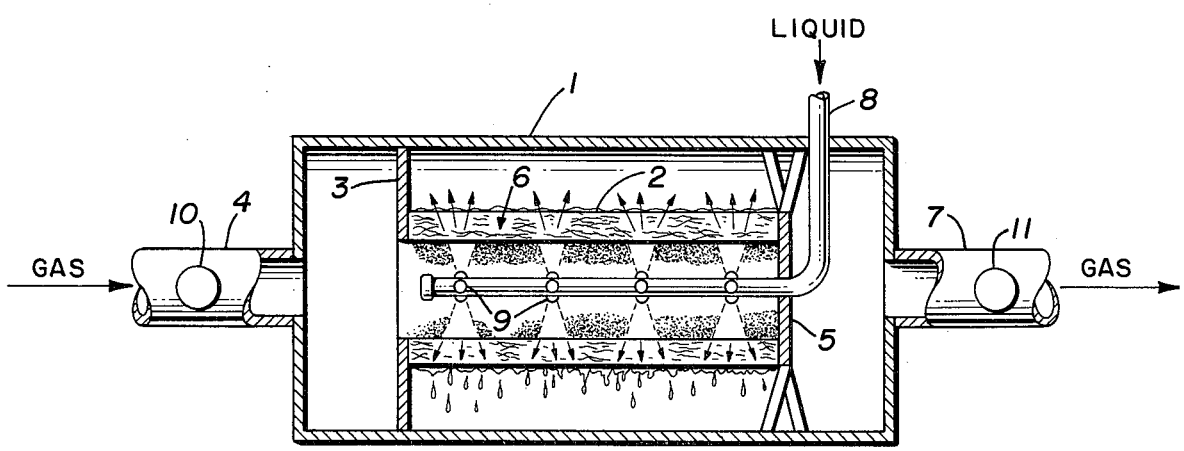
FIG. 2 is a side view, partly cut away, of a fiber bed separator showing a cylindrical element disposed in a horizontal position, which illustrates two preferred embodiments of this invention, as will hereinafter be made clear.

A preferred embodiment of this invention for use in separating sub-micron and larger liquid aerosols from gases is illustrated in FIG. 2 (ignoring the spray system) wherein a vessel 1 is provided with a cylindrical fiber bed element 2 disposed in a horizontal position. The cylindrical element is mounted within the vessel on tubesheet 3 which functions as a baffle such that the liquid aerosol containing gas stream which is introduced through inlet 4 is caused to flow into the hollow core of cylindrical element 2 and then, because of cover plate 5 at the opposite end of the cylindrical element, radially outwardly through fiber bed 6. The treated gas stream then leaves vessel 1 via outlet 7. The collected liquid phase drains from the outer circumference of the cylindrical element 2 and is removed from the vessel by any suitable means (not shown) which allows removal of liquid from a vessel while maintaining a gas seal, such as a seal pot.

Although FIG. 2 shows only one cylindrical element, a plurality of cylindrical elements can be mounted in tubesheet 3 in similar manner to provide any desired fiber bed surface area depending upon the volume flow rate of the gas to be treated, the desired bed velocity and pressure drop through the fiber bed.

In certain applications where the gas to be treated contains a solid or non-flowing liquid (e.g., grease) aerosol which tends to accumulate in the fiber bed, removal thereof may be accomplished by irrigation or spraying of a liquid media from the hollow core of cylindrical element 2 such that the liquid flows radially outwardly through the fiber bed. In such applications means will be provided to spray such liquid into the aerosol containing gases being treated at some point upstream of the fiber bed. Such removal of collected solid particulates from the fiber bed may be accomplished by continuous spraying of the liquid into the gas stream or intermittently so as to continuously or periodically remove the collected particulates, for example, when the pressure drop through the fiber bed has increased, or the collection efficiency has decreased, to some minimally acceptable limit.

FIG. 2, therefore, further illustrates, further preferred embodiments of this invention, one suitable means of introducing a liquid for removal of non-flowing aerosols trapped in the fiber bed, such as solids, fats, greases, etc. A suitable liquid is introduced through pipe 8 into the hollow core of cylindrical element 2. Pipe 8 is fitted within the central core with a plurality of fogging or spray nozzles 9 disposed such that their fogging or spray pattern covers the entire inner surface of the fiber bed 6. The liquid fog or spray combines with the aerosol containing gas being treated to flow radially outwardly through the fiber bed. If desired, where intermittent cleaning of the fiber bed is practiced, the flow of the aerosol containing gas may be discontinued and another gas such as air may be substituted as the gas stream. In any event, the liquid media, finely dispersed in the gas stream, is carried into the fiber bed where it is collected as a liquid phase; dissolving, dispersing or otherwise flushing the collected particulates from the fiber bed.

Sampling port holes 10 and 11 form no part of this invention and are shown in FIG. 2 solely for the reason they are used in the working examples, infra, in the collection of initial vs. exit aerosol loading data. In normal practice such sampling ports are either omitted or blocked off.

FIG. 3 is presented merely for comparative purposes in the working examples, infra, to compare operation of the horizontally disposed cylindrical element shown in FIG. 2 with the same cylindrical element disposed vertically. The only other difference, as shown, between the separators of FIGS. 2 and 3 is the location of gas inlet 4. It is understood, however, that in the practice of this invention, inlet (4) may be in any position upstream of the fiber bed.

FIGS. 4 and 5 are presented to compare the flow direction (arrows) of the collected liquid phase when the present invention is practiced (FIG. 4) as opposed to the flow direction thereof when the present invention is not practiced (FIG. 5). Both of these Figures are an end view of a cylindrical element disposed in the horizontal position.

Thus, in FIG. 4 it is seen that when fiber bed is designed such that the residual saturation of the fiber bed against gas phase drag ($R_v$) of the liquid phase is less than the residual saturation of the fiber bed against gravity drainage ($R_g$) of the liquid phase, the liquid phase will flow radially outwardly from the inner surface of the fiber bed to the outer circumference thereof throughout the entire volume of the fiber bed and thence will drain around the circumference of the fiber bed for collection in optional drainage trough 12. Thus, the entire fiber bed operates with full efficiency to remove the liquid from the gas stream being treated.

In contrast, FIG. 5 illustrates that when contrary to the requirements of this invention, the fiber bed is designed such that $R_v$ is greater than $R_g$, the portion of the fiber bed at the top of the cylindrical element operates unsatisfactorily with respect to removal of the liquid aerosol or spray because the gas drag in this zone is insufficient to overcome gravity drainage, resulting in flooding of this zone with liquid and higher pressure drop. Moreover, in those applications where the liquid is used to clean collected aerosol particles from the fiber bed, cleaning in this zone will be ineffective eventually resulting in plugging of this zone such that the effective surface area of the fiber bed available for separation of the aerosol is greatly reduced with concomitant increased bed velocity through the remaining unplugged portion of the fiber bed increased pressure drop and lower collection efficiency. Furthermore, the drainage pattern of the liquid from this zone will adversely effect the operation of sections of the fiber bed adjacent to this zone, thus compounding the loss in performance.

In certain instances, particularly where the fiber beds have a $R_v$ which is substantially less than $R_g$, some re-entrainment of the collected liquid phase may occur in the treated gases exiting the fiber bed. In such event, if re-entrainment becomes a problem the separators of this invention may be further provided downstream of the fiber bed with any conventional entrainment separator known in the art; such as for example impingement baffles, mesh pads or filters. It is, however, another advantage of this invention, that re-entrainment problems are minimized (as opposed to vertical positioning of the cylindrical element) because of the shorter drainage path around the outer circumference of the cylindrical element.

In a preferred embodiment, however, when necessary, reentrainment can be avoided by use of a cylindrical element as shown in FIG. 6 wherein cylindrical element 2 is provided not only with fiber bed 6 designed in accordance with the principles of this invention, but is further provided with a second fiber bed 13 which encircles the outer circumference of fiber bed 6 in substantially intimate fiber to fiber contact each with the other.

Fiber bed 13 is designed such that $R_v$ is greater than $R_g$; i.e., such that the residual saturation of fiber bed 13 against gas drag of the liquid phase is greater than the residual saturation thereof against gravity drainage of the liquid phase. The collected liquid phase then drains circumferentially through said fiber bed 13 or along the interface between fiber beds 6 and 13. Determination of fiber diameters and bed voidages useful in fiber bed 13 can be determined using the principles of this invention. For example, in FIG. 1 it can be seen that "C" fiber, which was found unsuitable for use as fiber bed 6, would be suitable for use in the system illustrated, as fiber bed 13 when either "A" or "B" fiber is used in fiber bed 6.

Such a cylindrical element would not be satisfactory for use, however, in applications such as, for example, removal of collected grease, where pluggage of the second fiber bed or at the interface between the two fiber beds may occur because of separation from the liquid of undissolved or immiscible highly viscous material such as grease.

As heretofore stated, the supporting screens for the fiber bed have been omitted from the drawings for purposes of clarity. Suitable support screens are well-known in the art and include any rigid support means which will maintain the mechanical stability of the fiber bed and yet be pervious to flow of the gas without significantly contributing to the pressure drop through the cylindrical element. The support means should be of a material which is not attached or corroded by any component in the aerosol containing gas being treated. Suitable materials include steel, stainless steel, fiber reinforced polyester, etc.

WORKING EXAMPLES

The following examples illustrate the practice of this invention with the cylindrical element disposed in a substantially horizontal position. For comparative purposes, examples are also included with the cylindrical element disposed in the vertical position, illustrating that through the practice of this invention, horizontal positioning of the cylindrical element is as efficient as vertical positioning insofar as separation of submicron and larger liquid aerosols from gases is concerned and that in certain applications where a liquid spray is used to clean collected non-flowing aerosol particulates trapped in the fiber bed, horizontal positioning is superior to vertical positioning.

In each example is used one cylindrical element 48 inches long by 18 inches outside diameter packed with a 3 inch thick bed of B fibers (i.e., long staple, untreated glass fibers of 10.5 micron nominal diameter) to a substantially uniform packing density or 11.7 pounds per cubic foot (i.e., about 92.6% bed voidage).

The cylindrical element is installed for evaluation in the horizontal position in the separator as shown in FIG. 2 equipped with liquid inlet pipe 8 and fogging nozzles 9. The same separator is used for the vertical evaluation of the cylindrical element, but rotated 90° as shown in FIG. 3.

To illustrate the practice of this invention as applied to cleaning the fiber bed with a liquid spray to remove collected particulates, the separator is shown in Examples I–III as applied to the removal of smoke emissions from a restaurant char broiler and the periodic cleaning of the fiber bed by spraying of an aqueous detergent solution into an air stream; the smoke essentially comprising sub-micron (mass mean diameter) aerosol fats and greases in air as formed by charbroiling hamburger on a grill equipped with a conventional smoke hood, blower and duct leading to the separator.

The separator is operated for several hours in collecting said smoke emissions, after which the smoke is discontinued and the wash cycle is started using air as the gas in which the aqueous detergent solution is sprayed to form a finely-dispersed spray. The wash cycle consists of an initial spray of hot water (about 120° F.) for 5 minutes at a rate of 2 gallons per minute, followed by a 30 minute spray of a 3.3% aqueous detergent solution at a rate of 2 gallons per minute, followed by a rinse spray of hot water (about 120° F.) for 15 minutes at a rate of 2 gallons per minute. In each instance, the initial spray, the detergent solution spray and the rinse spray in the air stream are at bed velocities of from 20 to 30 feet per minute, whereat $R_v$ is less than $R_g$.

The detergent used in Examples I and II is a vegetable oil amine sold by Norman Fox and Company under the code number 902-101.

EXAMPLE I

HORIZONTAL CYLINDRICAL ELEMENT 77.5 pounds of hamburger are broiled over a period of 5 hours, the smoke being collected in the fiber bed as fats, greases and carbon. The average solid aerosol loading in this smoke is 2.8 mgm per ACF. The overall collection efficiency of the fiber bed is over 95% and only a slightly visible plume is emitted from the separator. The fiber bed is then washed according to the cycle described above with an overall collection efficiency of the detergent solution of about 100%. The fiber bed is then dried by continuing the air flow for about 8 hours (in actual use this drying step is not required).

The following table shows the results:

| Fiber Bed Condition | Pressure Drop ΔP (inches H$_2$O) | Bed Velocity (FPM) | Flow Resistance Co = ΔP/v |
|---|---|---|---|
| Initial Dry Bed | 7.4 | 50.76 | 0.146 |
| End of Smoke Cycle | 7.6 | 45.76 | 0.166 |
| After Wash and Dry | 7.35 | 48.33 | 0.152 |

In the above table, the Flow Resistance Coefficient (Co) provides an accurate means for determining the cleaning efficiency of the wash cycle since it corrects for variations in pressure drop through the fiber bed due to changes in bed velocity. Thus, the above data shows that this wash cycle using this detergent solution substantially restored the fiber bed to its original condition.

EXAMPLE II

VERTICAL CYLINDRICAL ELEMENT

Example I is repeated using the same quantity of the same hamburger with the separator rotated as shown in FIG. 3 such that the cylindrical element is vertical. All cycle times and the detergent solution are the same as in Example I. The smoke has an average aerosol loading of 3.7 mgm per ACF and is removed with a collection efficiency over 90%. The detergent solution is removed with a collection efficiency of about 100%. The following table shows the results.

| Fiber Bed Condition | Pressure Drop ΔP (inches H$_2$O) | Bed Velocity (FPM) | Flow Resistance Co = ΔP/v |
|---|---|---|---|
| Initial Dry Bed | 7.8 | 45.4 | 0.172 |
| End of Smoke Cycle | 8.05 | 41.71 | 0.193 |
| After Wash and Dry | 8.75 | 43.46 | 0.201 |

The above data shows that when cleaning the fiber bed to recover solid particulates, particularly such difficultly soluble solids as fats and greases from the fiber bed, vertical positioning of the cylindrical element is actually inferior to horizontal positioning of the element when using this detergent solution and wash cycle. This is found upon inspection to be the result of solidification of the grease as the wash solution cools while flowing through the fiber bed, which occurs to a greater extent in the vertical position than in the horizontal position because the drainage path is longer.

In any event, all of the washing solution flowed radially from the inner surface of the fiber bed to the outer surface thereof in both the horizontal cylindrical element (Example I) and the vertical cylindrical element (Example II) showing that when $R_v$ is less than $R_g$ the collection of the liquid spray is not influenced by the angle at which the cylindrical element is disposed.

A further test in the horizontal position is shown in Example III using a more effective detergent solution for this application. The detergent used in Example III (again as a 3.3% aqueous solution) is a non-ionic detergent with butyl-cellusolve degreaser and phosphate builders sold by Mark Chemical Company under the trade name, Act Shine Heavy Duty Degreaser. Example III illustrates that with the use of a better detergent for this application, the horizontally positioned cylindrical element can be cleaned by the practice of this invention to its original pre-run condition of cleanliness as evidenced by comparing the initial flow resistance coefficient with that after cleaning and drying.

EXAMPLE III

Example I is repeated, substituting the above defined detergent solution for that used in Example I. The following table shows the results.

| Fiber Bed Condition | Pressure Drop ΔP (inches H$_2$O) | Bed Velocity (FPM) | Flow Resistance Co = ΔP/v |
|---|---|---|---|
| Initial Dry Bed | 6.75 | 45.67 | 0.148 |
| End of Smoke Cycle | 6.95 | 44.38 | 0.157 |
| After Wash and Dry | 7.4 | 50.76 | 0.146 |

To illustrate the practice of this invention as applied to separation of sub-micron and larger liquid aerosols, the separators of FIGS. 2 and 3 (omitting the spray system) are used in the following Example IV as applied to the removal of dioctyl phthalate mist from an air stream, using the same cylindrical element used in Examples I–III and as described, supra.

EXAMPLE IV

An air stream containing from 5 to 10 mgm of dioctyl phthalate per actual cubic foot (ACF) of air as an aerosol having a mass mean particle diameter of less than 1 micron is passed through the fiber bed of the cylindrical element at a bed velocity of from 20 to 30 feet per minute; whereat $R_v$ is less than $R_g$. Both collection efficiency and pressure drop are substantially equivalent with the cylindrical element positioned both horizontally as in FIG. 2 and vertically as in FIG. 3.

Cumulatively, therefore, the foregoing examples show that when the present invention is used, liquid aerosols or sprays are effectively separated from a gas stream without regard to the angle at which the cylindrical element is positioned. Further, they show that liquid flow is as claimed in this invention as demonstrated by the washing effectiveness in Examples I–III, and the liquid aerosol separation in Example IV. These examples further show, however, that in applications where difficultly soluble solid aerosols are separated from gases and a liquid spray is used to clean accumulated solids from the fiber bed, vertical positioning of the cylindrical element is actually inferior to disposing of the cylindrical element in a horizontal position insofar as cleaning effectiveness is concerned.

The foregoing description of the several embodiments of this invention as described above and in the drawings is not intended as limiting of this invention. As will be apparent to those skilled in the art the inventive concept set forth herein can find many applications in the art of fiber bed separations and many variations on and modifications to the embodiments described herein may be made without departing from the spirit and scope of this invention.

I claim:

1. In a process for removing a liquid from a moving gas stream in a separator by flowing said liquid containing gas through at least one cylindrical fiber bed element contained in said separator, each of said at least one cylindrical fiber bed element comprising a non-matting bed of randomly distributed fibers having a mean diameter of at least about 5 microns packed to a substantially uniform bed voidage of from about 85 to 98% within the annular space between two substantially concentric cylindrical screens to provide a hollow core in said at least one cylindrical element, said flow resulting in separation of a substantial proportion of the liquid from the gas as a collected liquid phase, the improvement comprising:

(a) causing said liquid containing gas to flow through each of said at least one cylindrical element from the core side thereof outwardly while each of said at least one cylindrical element is oriented with its longitudinal axis at an angle of from about 0° to 30° from the horizontal, the fiber bed in each of said at least one cylindrical element being such that (i) it is operating under non-flooding conditions for the liquid loading contained in the gas and (ii) the residual saturation of said fiber bed against gas phase drag of the liquid phase is less than the residual saturation of said fiber bed against gravity drainage of the liquid phase, and (b) continuously draining the collected liquid phase from the outer circumference of each of said at least one cylindrical element.

2. A process as in claim 1 wherein each of said at least one cylindrical element is oriented substantially horizontally.

3. A process as in claim 1 wherein the liquid contained in the gas is a liquid aerosol of less than 3 microns.

4. A process as in claim 3 wherein each of said at least one cylindrical element is oriented substantially horizontally.

5. A process as in claim 1 wherein said moving gas stream contains a solid or nonflowing liquid aerosol of less than 3 microns which is separated from said moving gas stream, and the fiber bed of each of said at least one cylindrical element is cleaned of said aerosol by spraying a liquid at least periodically into said moving gas stream upstream of said fiber bed as all or a portion of the liquid being separated.

6. A process as in claim 5 wherein the liquid spray is introduced into said gas stream within the hollow core of said at least one cylindrical element.

7. A process as in claim 5 wherein each of said at least one cylindrical element is oriented substantially horizontally.

8. A process as in claim 5 wherein said liquid media is a solvent or washing solution which flushes otherwise water insoluble particulates from each of said at least one fiber bed.

9. A process as in claim 1 for highly efficient removal of solid, non-flowable liquid or flowable liquid aerosols from aerosol containing gases wherein the fibers of each of said at least one fiber bed have a mean diameter of from about 5 to 20 microns.

10. A process as in claim 9 wherein the fibers of each of said at least one fiber bed are glass fibers packed to a bed density of from about 5 to 20 pounds per cubic foot.

11. A process as in claim 10 wherein the fibers of each of said at least one fiber bed are untreated hydrophilic long staple glass fibers of substantially uniform fiber diameter of from about 7 to 12 microns packed to a bed density of from about 10 to 16 pounds per cubic foot.

12. A process as in claim 1 for the treatment of gases containing solid, non-flowable liquid or flowable liquid aerosols at high bed velocities wherein the fibers of each of said at least one fiber bed have a mean diameter of from about 25 to 75 microns.

13. A process as in claim 12 wherein the fibers of each of said at least one fiber bed are glass fibers packed to a bed density of from about 3 to 15 pounds per cubic foot.

14. A process as in claim 13 wherein the fibers of each of said at least one fiber bed are untreated curly glass fibers of substantially uniform fiber diameter of from about 25 to 35 microns packed to a bed density of from about 5 to 10 pounds per cubic foot.

15. A process as in claim 1 wherein re-entrainment of the liquid phase in said moving gas stream leaving each of said at least one cylindrical element is substantially prevented by passing said moving gas stream, within each said at least one cylindrical element, sequentially through a first fiber bed and a second fiber bed, said first fiber bed being that described in claim 1, and said second fiber bed being a non-matting bed of randomly distributed fibers packed to a bed voidage of from about 85 to 99%, said second fiber bed encircling said first fiber bed such that they are in substantially intimate fiber to fiber contact with each other, and the mean fiber diameter and voidage of said second fiber bed during such that the residual saturation thereof against gas phase drag of the liquid phase is greater than the residual saturation thereof against gravity drainage of the liquid phase, whereby the collected liquid phase is caused to drain by gravity flow through said second fiber bed or at said interface.

16. A process as in claim 15 wherein each of said at least one cylindrical element is oriented substantially horizontally.

17. A process as in claim 16 wherein said moving gas stream contains a solid or non-flowing liquid aerosol of less than 3 microns which is separated from said moving gas stream, and the fiber beds of each of said at least one cylindrical element are cleaned of said aerosol by spraying a liquid at least periodically into said moving gas stream upstream of said fiber beds as all or a portion of the liquid being separated.

18. A process as in claim 17 wherein the liquid spray is introduced into said moving gas stream within the hollow core of each of said at least one cylindrical element.

19. A process as in claim 18 wherein each of said at least one cylindrical element is oriented substantially horizontally.

20. A process as in claim 18 wherein said liquid media is a solvent or washing solution which flushes otherwise water insoluble particulates from said first and second fiber beds.

21. A process as in claim 15 wherein the liquid contained in the gas is a liquid aerosol of less than 3 microns.

22. A process as in claim 21 wherein each of said at least one cylindrical element is oriented substantially horizontally.

23. A process as in claim 15 for highly efficient removal of solid, non-flowable liquid or flowable liquid aerosols from gases wherein the fibers of said first fiber bed have a mean diameter of from about 5 to 20 microns packed to a bed density of from about 5 to 20 pounds per cubic foot.

24. A process as in claim 23 wherein the fibers of said first fiber bed are untreated hydrophilic long staple glass fibers of substantially uniform fiber diameter of from about 7 to 12 microns packed to a bed density of from about 10 to 16 pounds per cubic foot.

25. A process as in claim 15 for the treatment of gases containing solid, non-flowable liquid or flowable liquid aerosols at high bed velocities wherein the fibers of said first fiber bed have a mean diameter of from about 27 to 75 microns.

26. A process as in claim 25 wherein the fibers of said first fiber bed are glass fibers packed to a bed density of from about 3 to 15 pounds per cubic foot.

27. A process as in claim 26 wherein the fibers of said first fiber bed are untreated curly glass fibers of substantially uniform fiber diameter of from about 25 to 35 microns packed to a bed density of from about 5 to 10 pounds per cubic foot.

* * * * *

UNITED STATES PATENT AND TRADEMARK OFFICE
CERTIFICATE OF CORRECTION

PATENT NO. : 4,120,671
DATED : October 17, 1978
INVENTOR(S) : Daniel E. Steinmeyer It is certified that error appears in the above—identified patent and that said Letters Patent are hereby corrected as shown below:

IN THE SPECIFICATION:

Column 3, line 42, "impervious of" should read -- impervious to -- .

IN THE CLAIMS:

Claim 6 (Column 17), line 58, "of said at least" should read -- of each of said at least -- .

Claim 15 (Column 18), line 38, "during" should read -- being -- .

Signed and Sealed this

Sixth Day of February 1979

[SEAL]

Attest:

RUTH C. MASON
Attesting Officer

DONALD W. BANNER
Commissioner of Patents and Trademarks